DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1046

T887,024
PHOTOGRAPHIC EMULSIONS FOR RAPID PROCESSING

Grant M. Haist, Rochester, David A. Pupo, Churchville, and James R. King, Webster, N.Y. (all of 166A Lake Ave., Rochester, N.Y. 14615)

Filed May 28, 1970, Ser. No. 41,574
Int. Cl. E03c *1/06, 1/48, 5/30*
U.S. Cl. 96—95
No Drawing. 22 Pages Specification

Photographic silver salt compositions, such as silver halide emulsions, containing a weighted hydroquinone developing agent, such as t-butyl hydroquinone or cyclohexylhydroquinone, and an alkaline-activatable stabilizer precursor, such as a thiuronium salt, have good keeping qualities and can be rapidly processed by alkaline activation.